United States Patent
Dinger et al.

(10) Patent No.: US 9,283,876 B2
(45) Date of Patent: Mar. 15, 2016

(54) HEAD RESTRAINT WITH STORAGE

(75) Inventors: Kevin D. Dinger, West Bloomfield, MI (US); James G. Gobart, Rochester, MI (US); Thomas E. Houck, Bloomfield Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 571 days.

(21) Appl. No.: 13/410,571

(22) Filed: Mar. 2, 2012

(65) Prior Publication Data
US 2013/0229035 A1 Sep. 5, 2013

(51) Int. Cl.
*A47C 7/62* (2006.01)
*B60N 2/48* (2006.01)
*B60N 2/44* (2006.01)

(52) U.S. Cl.
CPC ........... *B60N 2/48* (2013.01); *B60N 2002/4405* (2013.01); *B60N 2002/4888* (2013.01)

(58) Field of Classification Search
CPC ............ A47C 7/72; A47C 7/62; B60R 7/043; B60N 2/4808; A47B 2200/0071
USPC ............... 297/188.04, 188.07, 188.01, 217.4, 297/217.5
See application file for complete search history.

(56) References Cited

U.S. PATENT DOCUMENTS

| | | | |
|---|---|---|---|
| 3,104,131 A * | 9/1963 | Krone | 297/411.24 |
| 4,702,519 A * | 10/1987 | Lobanoff | 297/185 |
| RE33,423 E * | 11/1990 | Lobanoff | 297/188.06 |
| 6,183,045 B1 * | 2/2001 | Marfilius et al. | 297/391 |
| 6,899,365 B2 * | 5/2005 | Lavelle et al. | 296/37.15 |
| 6,905,167 B2 * | 6/2005 | Jost | 297/188.04 |
| 7,188,896 B2 * | 3/2007 | Embach | 297/217.4 |
| 7,213,877 B2 * | 5/2007 | Gramss | 297/188.03 |
| 8,201,203 B2 * | 6/2012 | Vitito | 725/75 |
| 8,292,364 B2 * | 10/2012 | Liu | 297/217.3 |
| 2007/0096512 A1 * | 5/2007 | Hanagan | 297/188.07 |
| 2013/0147239 A1 * | 6/2013 | Guering | 297/185 |

FOREIGN PATENT DOCUMENTS

| AU | 2490571 A | 8/1972 |
|---|---|---|
| DE | 102006026840 A1 | 12/2007 |
| DE | 102008013123 A1 | 9/2009 |

* cited by examiner

*Primary Examiner* — David E Allred
*Assistant Examiner* — Alexander Harrison
(74) *Attorney, Agent, or Firm* — Quinn Law Group, PLLC

(57) ABSTRACT

A seat assembly having a seatback and a head restraint is provided. The seat assembly includes a support member extending between the head restraint and the seatback. The support member is configured to attach the head restraint to the seatback, and may extend downward into the seatback. The support member separates the head restraint into a forward portion and a rearward portion. A receptacle cavity is defined within the rearward portion of the head restraint. The receptacle cavity is configured to receive one or more articles.

8 Claims, 3 Drawing Sheets

_US 9,283,876 B2_

HEAD RESTRAINT WITH STORAGE

TECHNICAL FIELD

This disclosure relates to head restraints for vehicle seating.

BACKGROUND

Automobiles and other vehicles include one or more seats for occupants of the vehicles, such as the driver and passengers. Different seating types include bucket seats and bench seats. Numerous features of the seats are configured to promote the function of supporting vehicle occupants in the seats. Seats and seating systems may include belts, latches, or restraints for supporting and holding the occupants.

SUMMARY

A seat assembly having a seatback and a head restraint is provided. The seat assembly includes a support member extending between the head restraint and the seatback. The support member is configured to attach the head restraint to the seatback, and may extend downward into the seatback.

The support member separates the head restraint into a forward portion and a rearward portion. A receptacle cavity is defined within the rearward portion of the head restraint. The receptacle cavity is configured to receive one or more items.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
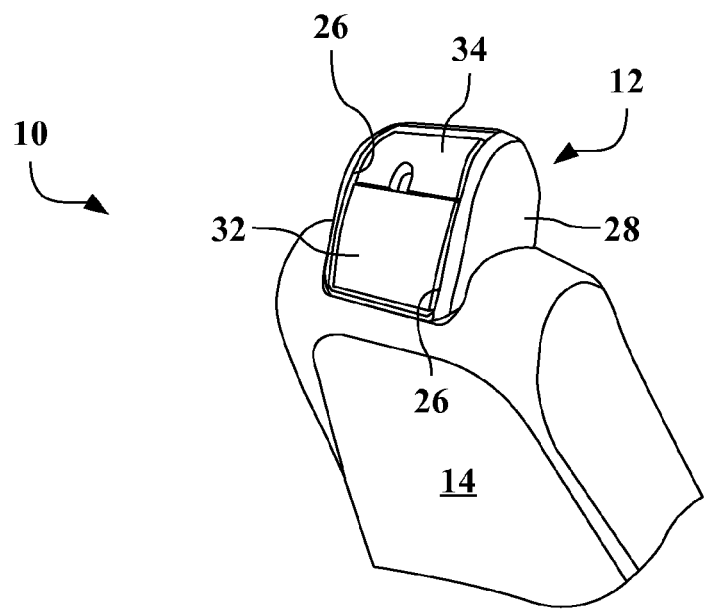
FIG. 1 is a schematic, isometric view of a seatback and a head restraint having a covered rotatable bin.

Referring to the drawings, wherein like reference numbers correspond to like or similar components whenever possible throughout the several figures, there is shown in FIG. 1 a schematic, isometric view of a portion of a seat assembly or a seat 10, which may be used in numerous vehicles (not shown). The seat 10 has a head restraint 12 that is configured for attachment to a seatback 14, as shown in FIG. 1. The seatback 14 may cooperate with a base (not shown) upon which the occupant sits.

Features and components shown in other figures may be incorporated and used with those shown in FIG. 1, and components may be mixed and matched between any of the configurations shown. While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

Occupants of the vehicle may be seated in the seat 10, or it may be vacant, and the seat 10 may be located in the front, back, or intermediate areas of the vehicle. The seat 10 illustrated is for a single occupant and includes only one head restraint 12. However, the seat 10 may be a bench seat for more than one occupant and have two or more head restraints 12 attached thereto.

Relative to the seat 10, the forward direction is the direction facing toward the occupant of the seat 10. The forward direction is often, although not necessarily, also the direction of forward travel for the vehicle.

Figure 2:
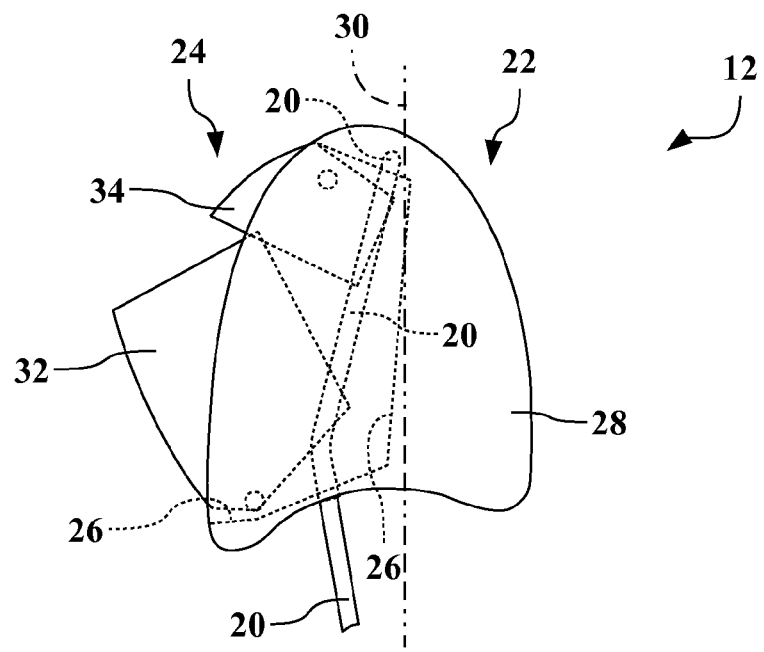
FIG. 2 is a schematic, side view of the head restraint of FIG. 1.

Referring also to FIG. 2, and with continued reference to FIG. 1, there is shown a schematic, side view of the head restraint 12. FIG. 2 schematically illustrates the location of components inside of the head restraint 12, with the internal portions shown in dashed lines. The head restraint 12 includes a support member 20 extending downward from the head restraint 12. The support member 20 is configured to attach the head restraint 12 to the seatback 14.

The support member 20 generally separates or divides the head restraint 12 into a forward portion 22 and a rearward portion 24. The forward portion 22 is the portion of the head restraint 12 which is in front of the support member 20, relative to the forward direction, and the rearward portion 24 is the remainder of the head restraint 12. As viewed in FIG. 2, the forward portion 22 is to the right of the support member 20 and the rearward portion 24 is to the left of the support member 20.

The position of the head restraint 12 may be adjustable relative to the seatback 14 by moving the support member 20 in and out of the seatback 14. Alternatively, or additionally, the whole head restraint 12 may be configured to pivot relative to the seatback 14, such as during folding of the seatback 14 relative to the base.

While the support member 20 is shown attached to the head restraint 12 in FIG. 2, the support member 20 may be attached to the seatback 14, such that the head restraint 12 articulates or moves relative to the support member 20 and the support member 20 is fixed relative to the seatback 14. In either case, the support member 20 provides attachment structure between the head restraint 12 and the seatback 14.

A receptacle cavity 26 is defined in the rearward portion 24 of the head restraint 12. Much, or all, of the forward portion 22 is filled by a padded region 28 having foam, cushioning, or other materials against which an occupant's head may rest or lean. As discussed herein, the receptacle cavity 26 is configured to receive one or more items, accessories, or articles, which may be placed, disposed, or stored therein. When used generally, items or accessories refers to any objects which may be within the vehicle and capable of being stored within the receptacle cavity 26.

A forward edge plane 30 may be defined by the forward edge of the support member 20. The receptacle cavity 26 may be substantially or completely behind the forward edge plane 30. The forward edge plane 30 may be substantially parallel to the seatback 14, or may be defined between the support member 20 and the intersection of the seatback 14 and the base. Alternatively, the forward edge plane 30 may be substantially vertical, relatively to gravity, when the seatback 14 is in a standard position—such as a neutral position in adjustable seats or the fixed position of fixed seats.

A first bin 32 is disposed within the receptacle cavity 26 and configured to pivot away from the support member 20. The first bin 32 may be attached at one or more pivot points or may have an axis or pin which attached to the head restraint 12. Therefore, the first bin 30 selectively opens in the rearward direction and may be used to hold or store items or accessories. The first bin 32 may be used by occupants seated behind the seat 10, such as in the back seats of the vehicle, or may be used for storage by the occupant of the seat 10. The first bin 32 operates as built-in storage and provides flexible use space for the vehicle occupants.

The head restraint 12 also includes a bin cover 34 in the rearward portion 24. The bin cover 34 opens to allow access to the first bin 32. In the configuration shown, the bin cover 34 pivots in conjunction with the first bin 32 through a linkage mechanism. However, the bin cover 34 could be configured to open and close independently, regardless of the position of the first bin 32.

Figure 3:
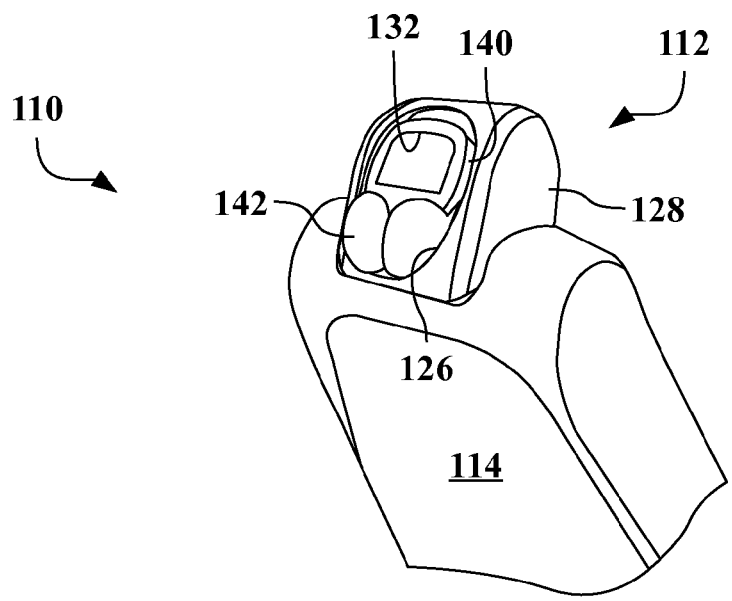
FIG. 3 is a schematic, isometric view of another head restraint having a molded accessory compartment and an open bin.

Referring now to FIG. 3, and with continued reference to FIGS. 1-2, there is shown a schematic, isometric view of a seat 110 having a head restraint 112 attached to a seatback 114. The head restraint 112 includes a support member (not viewable in FIG. 3) extending downward into the seatback 114.

A receptacle cavity 126 is defined in a rearward portion (generally leftward, as viewed in FIG. 3) of the head restraint 112. A padded region 128 having foam, cushioning, or other materials is defined in a forward portion (generally rightward, as viewed in FIG. 3). The receptacle cavity 126 includes multiple features to receive one or more accessories.

The forward and the rearward directions may be defined relative to the seating area or seat cushion of the seat 110, such that forward points toward where the occupant sits. Therefore, the forward direction remains the same relative to the seat 110, even if the seat 110 is aligned to face the rear of the vehicle.

The receptacle cavity 126 of the head restraint 112 includes a first bin 132, which is an open bin. The first bin 132 is open toward the back of the seat 110 and items may be set or placed into the first bin 132.

A first molded aperture 140 is also formed in the receptacle cavity 126 of the head restraint 112. In this configuration, the first molded aperture 140 is formed substantially around the first bin 132 but does not block or restrict access thereto. The first molded aperture 140 is shaped to mate with a first specific accessory 142. As used herein, specific accessories are those that are paired with the respective molded apertures.

In the head restraint 112, the first specific accessory 142 is a wireless headset, which is shown within the first molded aperture 140 in FIG. 3. The first molded aperture 140 is shaped to hold the first specific accessory 142, such that the wireless headset is fully supported and cradled within the first molded aperture 140 and the wireless headset may be stored therein when not in use. The first molded aperture 140 may be shaped to apply pressure or holding force to the first specific accessory 142, which may allow the first specific accessory 142 to stay within the first molded aperture 140 in spite of acceleration or vibration of the seat 110.

Figure 4:
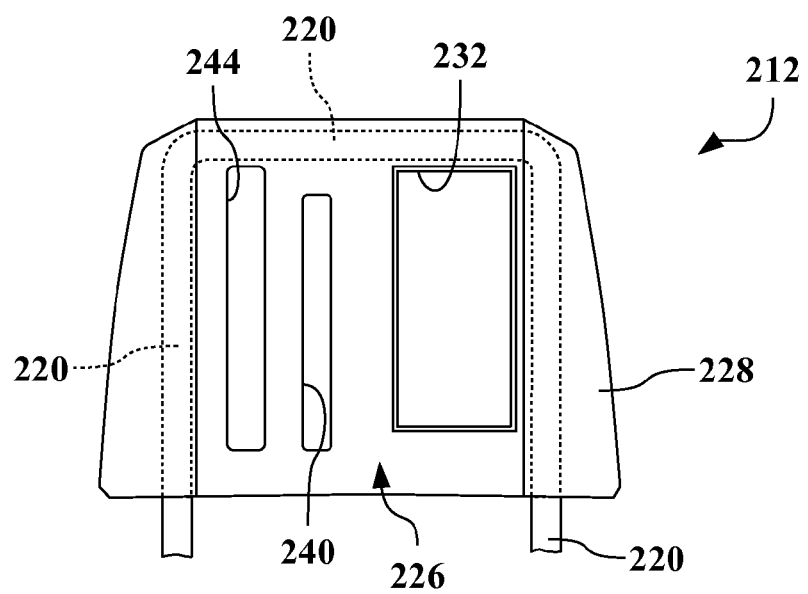
FIG. 4 is a schematic, plan view of another head restraint having two molded accessory compartments and a bin.

Referring now to FIG. 4, and with continued reference to FIGS. 1-3, there is shown a schematic, plan view of the back of a head restraint 212 configured to be attached to a seatback (not shown). The head restraint 212 includes a support member 220 extending downward toward the seatback.

A receptacle cavity 226 is defined in a rearward portion (the viewpoint of FIG. 4) of the head restraint 212. A padded region 228 having foam, cushioning, or other materials is defined in a forward portion (on the opposing side of the head restraint 112, as viewed in FIG. 4). The receptacle cavity 226 includes multiple features to receive one or more accessories.

As shown in FIG. 4, the support member 220 forms a downward U-shape, which opens toward the seatback, which may be similar to the seatback 14 shown in FIG. 1. The receptacle cavity 226 is substantially within the downward U-shape of the support member 220.

The receptacle cavity 226 of the head restraint 212 includes a first bin 232, which is an open bin. The first bin 232 is open toward the back of the seat and items may be set or placed into the first bin 232. Depending upon the configuration of the head restraint 212, the first bin 232 may be formed directly from the materials making up the rearward portion of the head restraint 212, for example, foam covered with fabric or leather. Alternatively, the first bin 232 may be formed from plastic (or other materials) and inserted into the head restraint 212. The first bin 232 may be attached to the rearward portion of the head restraint 212 with, for example, fasteners, adhesives, or spring catches, of the first bin 232 may be press-fit into the rearward portion.

A first molded aperture 240 is also formed in the receptacle cavity 226 of the head restraint 212. In this configuration, the first molded aperture 240 is formed next to the first bin 232 and does not block or restrict access thereto. A second molded aperture 244 is also formed in the receptacle cavity 226. In this configuration, both the first molded aperture 240 and the second molded aperture 244 are vertical receptacles next to the first bin 232.

The first molded aperture 240 is shaped to mate with a first specific accessory. Similarly, the second molded aperture 244 is shaped to mate with a second specific accessory.

The first molded aperture 240 and the second molded aperture 244 may be formed from, for example and without limitation: plastic, rubber, foam, or combinations thereof. The first molded aperture 240 and the second molded aperture 244 may be slightly smaller than the respective specific accessories, such that the first and second specific accessories are placed under slight pressure when inserted into the first molded aperture 240 and the second molded aperture 244.

For the head restraint 212 shown in FIG. 4, the first specific accessory for which the first molded aperture 240 is shaped may be, for example, a smart phone. The second molded aperture 244 may be shaped to fit, for example, a portable gaming device or a tablet (small computer). The first molded aperture 240 and the second molded aperture 244 are configured to cradle and support the respective specific accessories.

Figure 5:
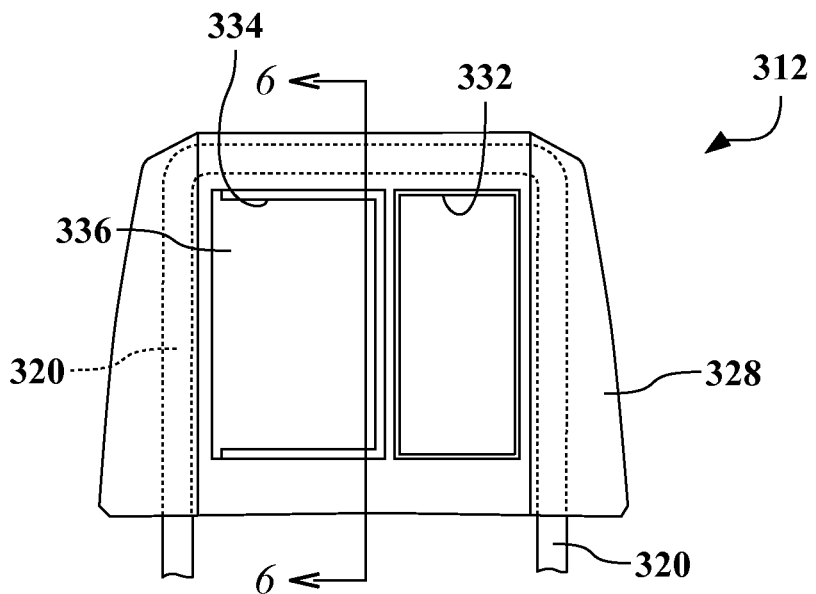
FIG. 5 is a schematic, plan view of another head restraint having an open bin and a bin with a door.
Figure 6:
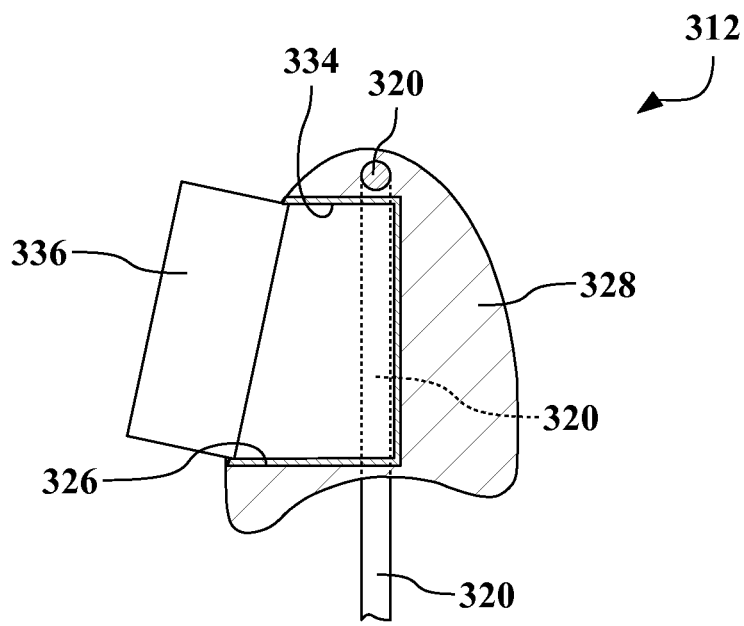
FIG. 6 is a schematic, cross-sectional view of the head restraint shown in FIG. 5, taken generally along line 6-6.

Referring now to FIG. 5 and FIG. 6, and with continued reference to FIGS. 1-4, there are shown two schematic views of a head restraint 312 configured to be attached to a seatback (not shown). FIG. 5 shows a rear view of the head restraint 312 and FIG. 6 shows a cross-sectional view taken along line 6-6 of FIG. 5. The head restraint 312 includes a support member 320 extending downward toward the seatback.

The support member 320 forms a downward U-shape, which opens toward the seatback. A receptacle cavity 326 is defined substantially within the downward U-shape of the support member 320, and is substantially rearward of the support member 320. Again, the forward direction is the direction facing the occupant, which is often, although not necessarily, also the direction of forward travel for the vehicle. The forward edge plane is not separately illustrated in FIG. 6, because the front edge of the support member 320 is substantially planar. Much of the remainder of the head restraint 312 is filled with a padded region 328.

The receptacle cavity 326 of the head restraint 312 includes a first bin 332, which is an open bin. The first bin 332 is viewable only in FIG. 5, and is open toward the back of the seat and items may be set or placed into the first bin 332.

The head restraint 312 also includes a second bin 334 disposed within the receptacle cavity 326. Unlike the first bin 332, which is open, the second bin 334 also includes a bin door 336. The bin door 336 is operatively attached to the second bin 334 and is configured to move between a closed position (shown in FIG. 5) blocking access to the second bin 334 and an open position (shown in FIG. 6) allowing access to the second bin 334.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A seat assembly comprising:
   a seatback;
   a head restraint;
   a support member extending between the head restraint and the seatback, wherein the support member is configured to attach the head restraint to the seatback and to separate the head restraint into a forward portion and a rearward portion, and wherein the support member is formed as a U-shape having an opening toward the seatback;
   a receptacle cavity defined in the rearward portion of the head restraint and configured to receive one or more items;
   a first bin disposed within and pivotably attached to the receptacle cavity; and
   a forward edge plane defined by the support member at a forward edge thereof,
   wherein the receptacle cavity is completely rearward of the forward edge plane, and
   wherein the receptacle cavity is substantially within the U-shape.

2. The seat assembly of claim 1, wherein the first bin is attached at a pivot point and is configured to pivot away from the support member, such that the first bin opens in the rearward direction.

3. The seat assembly of claim 1, further comprising:
   a second bin disposed within and operatively attached to the receptacle cavity;
   a bin door operatively attached to the second bin and configured to move between a closed position blocking access to the second bin and an open position allowing access to the second bin.

4. A head restraint for attachment to a seatback comprising:
   a support member extending between the head restraint and the seatback, and configured for attaching the head restraint to the seatback, wherein the support member separates the head restraint into a forward portion and a rearward portion, and forms a downward U-shape opening toward the seatback;
   a receptacle cavity defined in the rearward portion of the head restraint and configured to receive one or more items, wherein the receptacle cavity is substantially within the downward U-shape of the support member; and
   a first bin disposed within and pivotably attached to the receptacle cavity.

5. The head restraint of claim 4, further comprising:
   a first molded aperture formed in the receptacle cavity, wherein the first molded aperture is shaped to mate with a first specific accessory.

6. A seat assembly comprising:
   a seatback;
   a head restraint;
   a support member extending between the head restraint and the seatback, wherein the support member is configured to attach the head restraint to the seatback and to separate the head restraint into a forward portion and a rearward portion, and wherein the support member is formed as a U-shape having an opening toward the seatback;
   a receptacle cavity defined in the rearward portion of the head restraint and configured to receive one or more items, wherein the receptacle cavity is substantially within the U-shape;
   a forward edge plane defined by the support member at a forward edge thereof, wherein the receptacle cavity is completely rearward of the forward edge plane; and
   a first bin disposed within and operatively attached to the receptacle cavity, wherein the first bin is attached at a pivot point and is configured to pivot away from the support member, such that the first bin opens in the rearward direction.

7. The head restraint of claim 6, further comprising:
   a first molded aperture formed in the receptacle cavity, wherein the first molded aperture is shaped to mate with a first specific accessory.

8. The seat assembly of claim 6, further comprising:
   a second bin disposed within and operatively attached to the receptacle cavity;
   a bin door operatively attached to the second bin and configured to move between a closed position blocking access to the second bin and an open position allowing access to the second bin.

* * * * *